(12) United States Patent
Tanaka

(10) Patent No.: US 7,283,169 B2
(45) Date of Patent: Oct. 16, 2007

(54) TIMING SIGNAL APPARATUS

(75) Inventor: Yasuyuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1025 days.

(21) Appl. No.: 10/610,997

(22) Filed: Jun. 30, 2003

(65) Prior Publication Data
US 2004/0008388 A1    Jan. 15, 2004

(30) Foreign Application Priority Data
Jul. 1, 2002 (JP) .............................. 2002-192248

(51) Int. Cl.
*H04N 3/14* (2006.01)
(52) U.S. Cl. ................................ 348/312
(58) Field of Classification Search ............... 358/513, 358/401; 348/312, 362
See application file for complete search history.

(56) References Cited

U.S. PATENT DOCUMENTS

| 4,984,002 A | 1/1991 | Kokubo ................... 348/296 |
| 6,580,456 B1 | 6/2003 | Jacobs .................... 348/312 |
| 6,903,776 B1 | 6/2005 | Tsujino et al. ............. 348/362 |
| 2001/0017659 A1 | 8/2001 | Suzuki .................... 348/312 |

*Primary Examiner*—Ngoc-Yen Vu
*Assistant Examiner*—Kent Wang
(74) *Attorney, Agent, or Firm*—Morgan & Finnegan, L.L.P.

(57) ABSTRACT

A timing generator includes a plurality of waveform generators. Each waveform generator includes a register which stores externally input data of a signal waveform to be generated and a waveform generation circuit which generates and outputs a signal on the basis of the data stored in the register, and updates the data stored in the register at a predetermined timing.

2 Claims, 10 Drawing Sheets

| WAVEFORM GENERATOR | INITIAL VALUE | FIRST CHANGE POINT | SECOND CHANGE POINT |
|---|---|---|---|
| 205-1 (XV1) | H | 12 | 15 |
| 205-2 (XV2) | H | 14 | 17 |
| 205-3 (XV3) | L | 10 | 16 |
| 205-4 (XV4) | L | 13 | 18 |
| 205-5 (H1) | L | 23 | |
| 205-6 (H2) | L | 23 | |

PRIOR ART

US 7,283,169 B2

TIMING SIGNAL APPARATUS

FIELD OF THE INVENTION

The present invention relates to a timing signal apparatus and timing signal system.

BACKGROUND OF THE INVENTION

Figure 9:
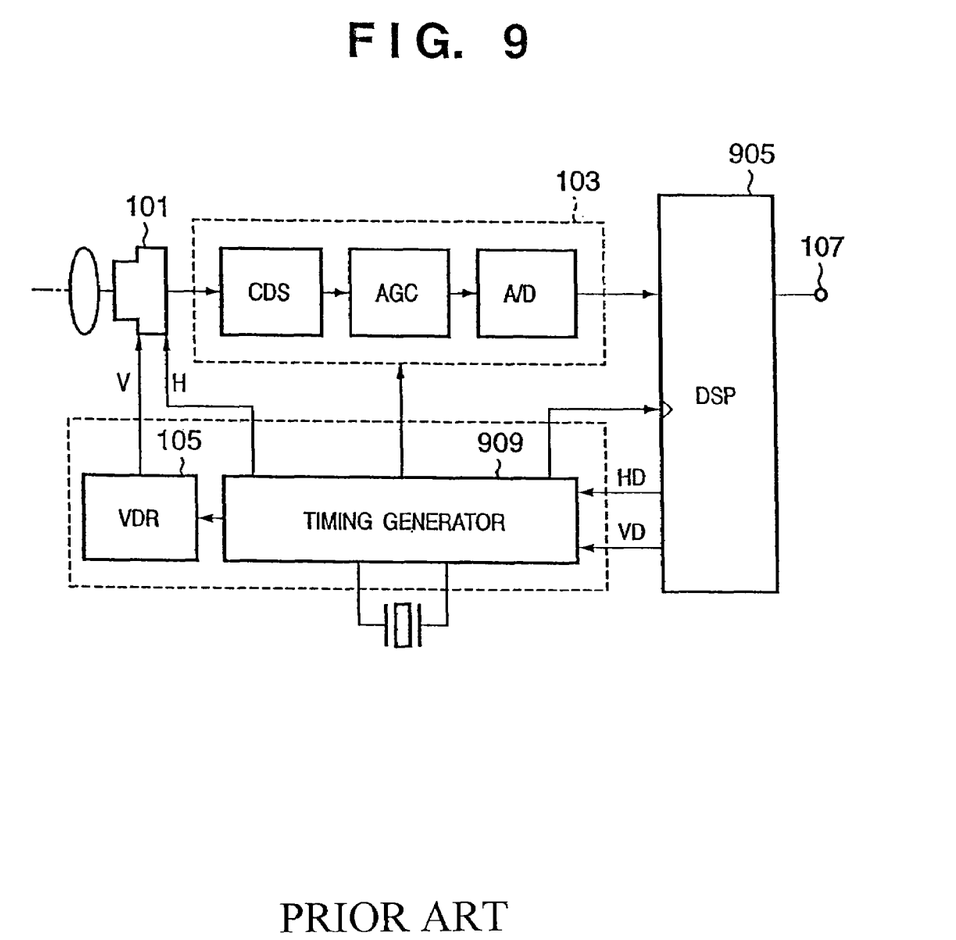
FIG. 9 is a block diagram showing the arrangement of a conventional image sensing apparatus.

FIG. 9 shows an example of the arrangement of the driving circuit of a conventional solid-state area image sensor. In FIG. 9, a horizontal transfer pulse directly from a timing generator 909 and a vertical transfer pulse from the timing generator 909 through a V driver 105 are applied to an area image sensor 101. In response to horizontal and vertical transfer pulses, an image signal sensed by the area image sensor 101 is read out and input to an analog front end 103. The analog front end 103 performs in turn correlated double sampling (CDS), gain adjustment, and A/D conversion for the input signal and supplies the processing result to a digital signal processor (DSP) 905 as a digital signal. The digital signal processor 905 forms an image signal consisting of a luminance signal and color difference signals using the supplied digital signal and outputs it to a terminal 107. The digital signal processor 905 operates in accordance with a clock generated by the timing generator 909. The digital signal processor 905 generates HD and VD pulses conforming to a predetermined standard such as the NTSC standard, the PAL standard, or the like and supplies them to the timing generator 909 in return. The timing generator 909 generates various read pulses for the area image sensor 101 on the basis of the HD and VD pulses, thereby achieving frame synchronization.

The conventional timing generator 909, however, is designed specifically for the area image sensor 101 and lacks in general versatility. To support a plurality of different image sensing modes such as a still image sensing mode, a monitor mode (mode in which the entire area of the area image sensor is read out in a 2-field period to achieve frame synchronization before sensing still images), and the like, in addition to a moving image sensing mode, the timing generator 909 must be arranged so that the area image sensor 101 can be driven and a read signal can be processed in each mode. Additionally, if some change needs to be made to a driving signal, the timing generator 909 itself must be manufactured again, thus resulting in an increase in cost.

SUMMARY OF THE INVENTION

The present invention has been made in consideration of the above situation, and has as its object to provide a timing signal generation apparatus, timing signal generation system, and image sensing apparatus, capable of flexibly changing a signal to be generated.

According to the present invention, the foregoing object is attained by providing a timing signal generation apparatus including a plurality of waveform generation units, each waveform generation unit comprises: a first storage device that stores externally input data of a signal waveform to be generated; and a signal generation unit that generates and outputs a signal on the basis of the data stored in the first storage device, wherein the data stored in the first storage device is updated at a predetermined timing.

According to the present invention, the foregoing object is attained by providing an image sensing apparatus comprising: an image sensor that senses an image of an object; a timing signal generation circuit that generates a driving pulse for driving the image sensor; a signal processing circuit that receives a signal from the image sensor and performs color processing on the signal; a memory that stores information for generating the driving pulse; an analog circuit that generates from a one-period clock signal a plurality of clock signals having different phases; and a waveform generation circuit that generates the driving pulse on the basis of the signals from the analog circuit and the information from the memory, wherein the memory is arranged on a same semiconductor substrate as that of the signal processing circuit, the analog circuit and the waveform generation circuit are arranged on a same semiconductor substrate as that of the timing signal generation circuit, and the signal processing circuit and the timing signal generation circuit are formed on the separate semiconductor substrates.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
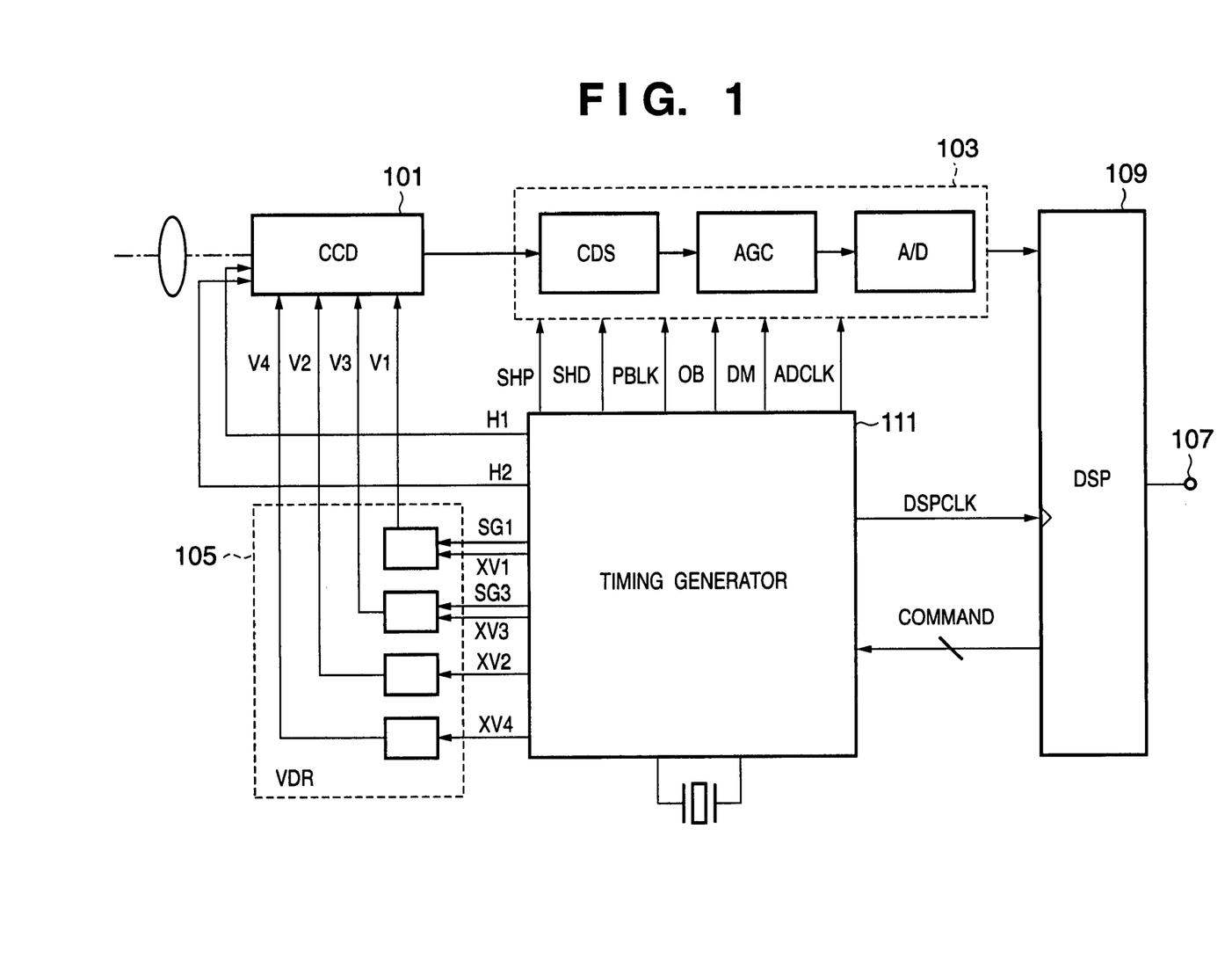
FIG. 1 is a block diagram showing the arrangement of an image sensing apparatus according to an embodiment of the present invention.

FIG. 1 is a block diagram showing the schematic arrangement of an image sensing apparatus according to an embodiment of the present invention. In FIG. 1, reference numeral 101 denotes an area image sensor (though labeled as a CCD in FIG. 1, this is, of course, not limited to the CCD); 111, a timing generator; 105, a vertical driver (VDR); 103, an analog front end; 109, a digital signal processor (DSP); and 107, a terminal for outputting an image signal from the DSP 109.

Figure 2:
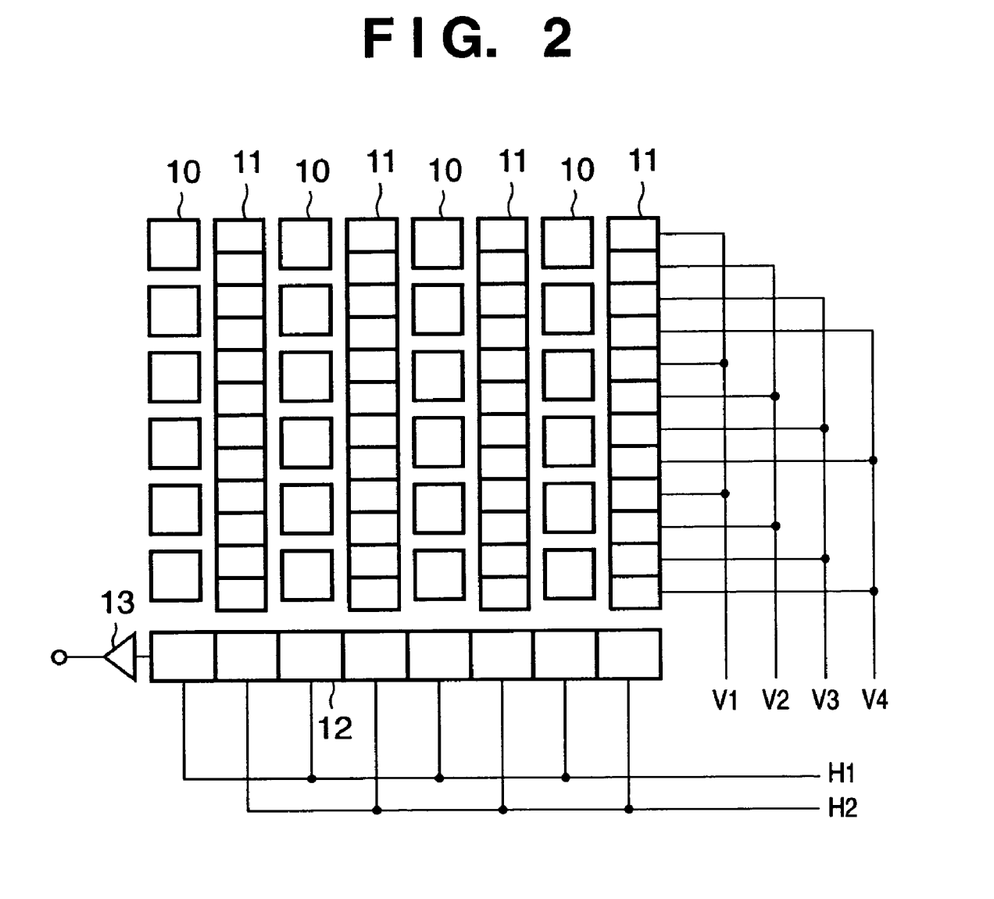
FIG. 2 is a diagram showing the outline of a general arrangement of an area image sensor.

FIG. 2 is a diagram showing the outline of a general arrangement of the area image sensor 101 and shows an example wherein a vertical transfer CCD 11 is 4-phase driven by vertical transfer pulses V1 to V4. In FIG. 2, reference numeral 10 denotes a photoelectric conversion element; 11, the vertical transfer CCD; 12, a horizontal transfer CCD; and 13, an output amplifier. Note that though FIG. 2 shows only 24 pixels for the sake of simplicity, the area image sensor 101 comprises a large number of pixels.

Horizontal transfer pulses H1 and H2 from the timing generator 111, a reset gate pulse (not shown) for setting to a specified value the voltage of the output amplifier incorporated in the CCD, and the like are applied to the area image sensor 101. Additionally, vertical transfer pulses V1, V2, V3, and V4 are applied from the timing generator 111 through the vertical driver 105 to the area image sensor 101, thereby driving the area image sensor 101. An image sensing signal from the area image sensor 101 driven by the timing generator 111 and vertical driver 105 undergoes correlated double sampling (CDS), gain adjustment, and A/D conversion in the analog front end 103 and is output as digital data. The digitized image signal is input to the DSP 109, which generates an image signal comprising a luminance signal and color difference signals and outputs them to the terminal 107. In this embodiment, the DSP 109 and the timing generator 111 each perform a part in generation of various waveforms.

Figure 3:
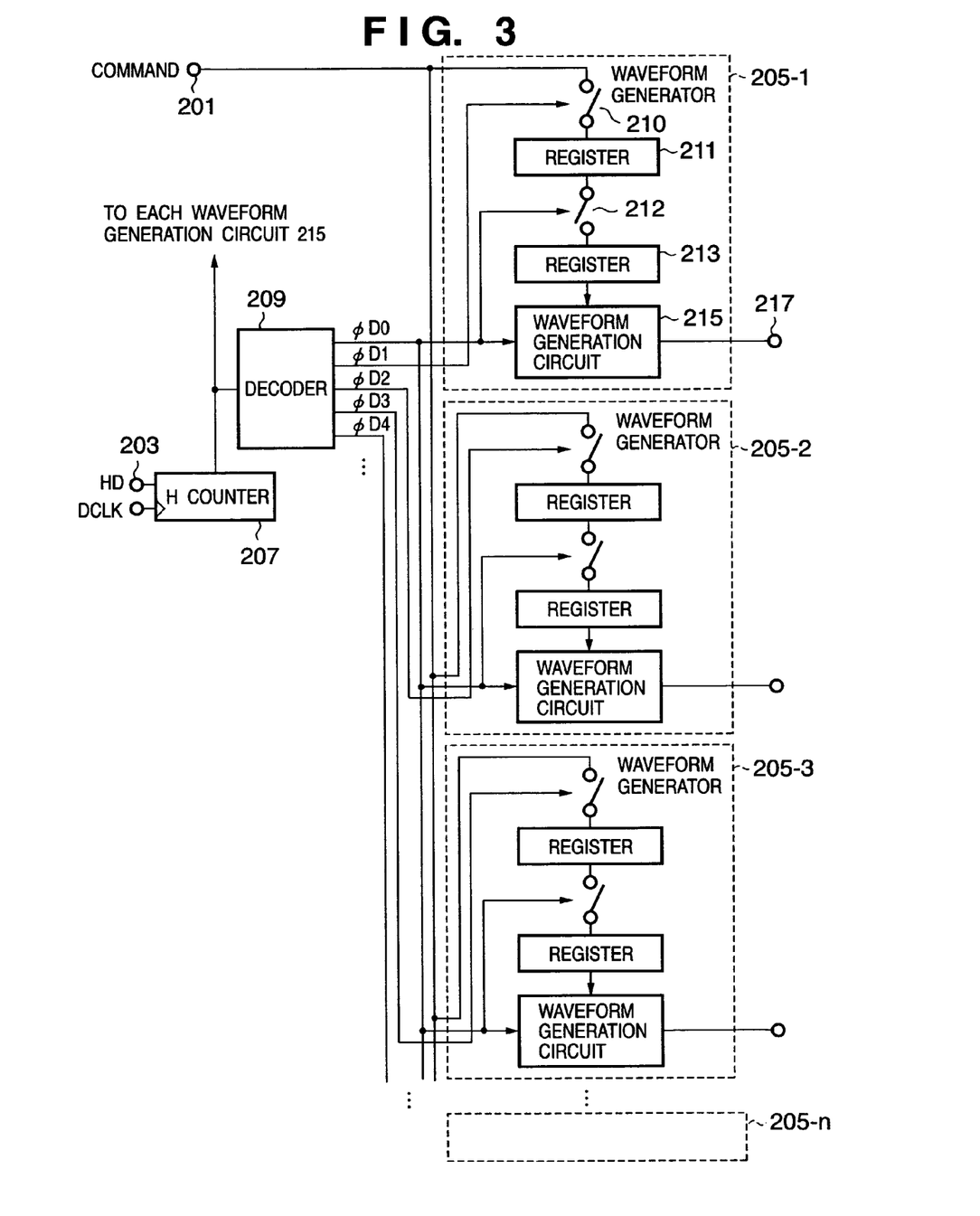
FIG. 3 is a block diagram showing the detailed arrangement of a timing generator according to the embodiment of the present invention.

FIG. 3 is a block diagram showing the detailed arrangement of the timing generator 111 according to this embodiment. Reference numeral 201 denotes an input terminal for inputting a command from the DSP 109; 203, an input terminal for inputting a horizontal timing signal (HD) from the DSP 109; 205-1 to 205-n, waveform generators; 207, a horizontal (H) counter; and 209, a decoder. Each of the waveform generators 205-1 to 205-n comprises a register 211, a register 213, a waveform generation circuit 215, and switches 210 and 212.

The waveform generators 205-1 to 205-n are provided to generate the waveforms of sensor gate pulses SG1 and SG3 to be applied to the vertical driver 105, 4-phase vertical transfer pulses XV1, XV2, XV3, and XV4, two-phase horizontal transfer pulses H1 and H2 to be applied to the area image sensor 101, correlated double sampling pulses SHP and SHD serving as sync signals of the processing in the analog front end 103, a PBLK pulse indicating a pre-blanking portion, an OB pulse indicating an optical black portion, a DM pulse indicating a dummy pixel, and the like, respectively. However, the internal structures of the waveform generators 205-1 to 205-n are basically the same.

Device efficiency increases by control of masking the horizontal transfer pulses H1 and H2 for a period during which they should not be generated (e.g., a period during which vertical transfer pulses are generated) than to generate their waveforms. This will be described later together with the internal structures of the waveform generators 205.

The operation of the timing generator 111 having the above-mentioned arrangement according to this embodiment will be described next.

The H counter 207 is reset to 0 at the trailing edge of an HD signal input to the input terminal 203 and is incremented in response to every clock pulse of a clock DCLK. The value of the H counter 207 is supplied to the decoder 209 and to the waveform generation circuits 215 incorporated in the respective waveform generators 205-1 to 205-n. When the H counter 207 is reset to 0 at the trailing edge of the HD signal, the decoder 209 sets a signal φD0 to high level (to be referred to as "H" hereinafter), thereby outputting the signal to all the waveform generators 205-1 to 205-n. This turns on the switch 212, and a command which has been stored in the register 211 before this timing is transferred to the register 213 in a manner to be described later. The waveform generation circuit 215 starts generating a waveform on the basis of the command stored in the register 213. Waveform generation will be described in detail later.

When the clock DCLK increments the H counter 207 to 1, the decoder 209 changes the signal φD0 to low level (to be referred to as "L" hereinafter) and changes a signal φD1 to "H". This turns on the switch 210 of the waveform generator 205-1, and a command input from the input terminal 201 is stored in the register 211 of the waveform generator 205-1. When the H counter 207 is then incremented to 2, the decoder 209 changes the signal φD1 to "L" and changes a signal φD2 to "H", thereby turning on the switch 210 of the waveform generator 205-2. With this operation, a command input from the input terminal 201 is stored in the register 211 of the waveform generator 205-2. In the same manner as described above, when the H counter 207 is incremented, the switch 210 of the corresponding waveform generator 205-n is turned on, and a command is stored in the register 211 of the corresponding waveform generator 205-n. This processing is repeated a number of times, which corresponds to a required type of signal or equals the number of the waveform generators 205.

When the H counter 207 is reset to 0 again at the trailing edge of the HD signal, the decoder 209 changes the signal φD0 to "H". This turns on the switches 212 of all the waveform generators 205-1 to 205-n and stores in the registers 213 commands which are stored in the registers 211. When each signal φDn is sequentially changed to "H" in the above-mentioned manner, a new command is stored in the register 213, and the waveform generation circuit 215 generates a waveform in accordance with a command stored in the register 213.

As described above, data of a waveform to be generated is stored in the register 211 in an immediately preceding horizontal period.

Figure 4:
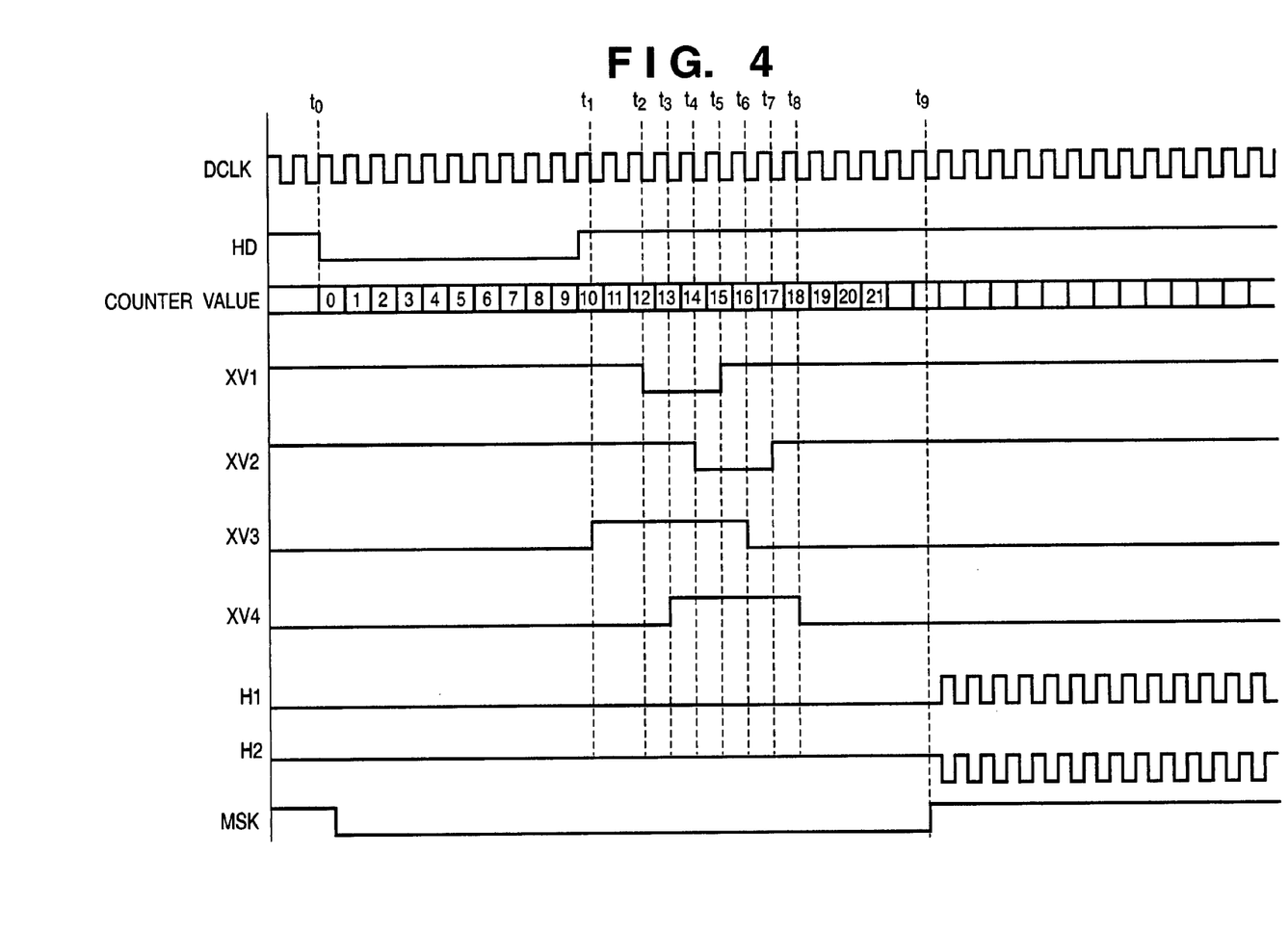
FIG. 4 is a timing chart for explaining how driving signals are generated by the timing generator according to the embodiment of the present invention.

Examples of commands and a waveform generation method in the waveform generation circuit 215 according to this embodiment will be described. A case will be described here wherein the vertical transfer pulses XV1 to XV4 having respective waveforms as shown in FIG. 4 are generated by the waveform generators 205-1 to 205-4, and the horizontal transfer pulses H1 and H2 are generated by the waveform generators 205-5 and 205-6.

Figure 5:
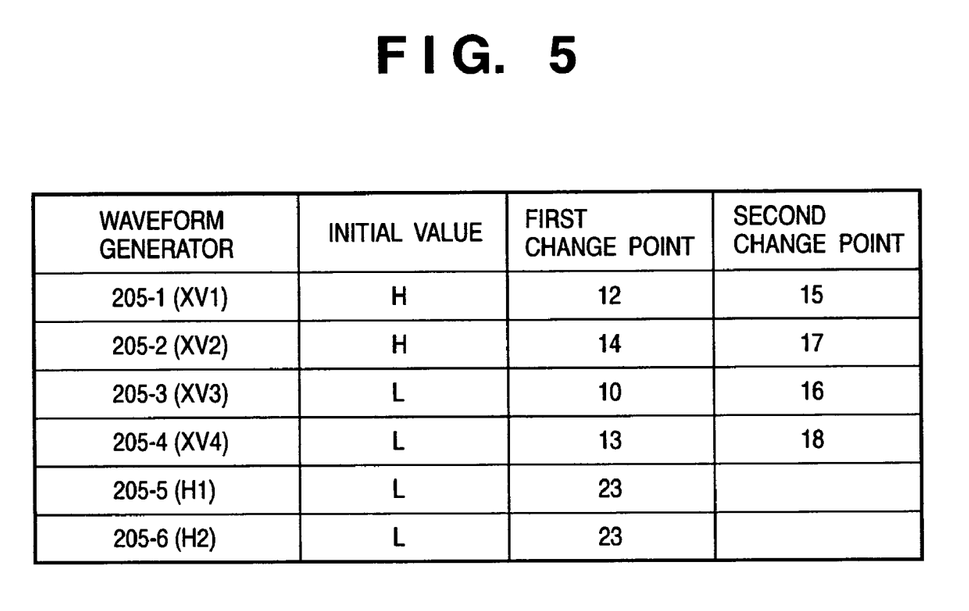
FIG. 5 is a table showing examples of commands for generating the driving signals shown in FIG. 4, according to the embodiment of the present invention.

Each command contains the initial value of a waveform and the counts of one or more change points, which are as shown in FIG. 5 in this case.

The waveform generator 205-1 stores in the register 211 a command representing that the initial value is "H", the first change point is 12, and the second change point is 15 when the value of the H counter 207 (to be referred as a "counter value" hereinafter) is 1 (φD1=H). At a timing when the H counter value becomes 0 next, the command is transferred to the register 213, and the processing starts on the basis of the transferred command. First, the waveform generation circuit 215 starts outputting the initial value "H" (t0). When the counter value reaches 12, which is the value of the first change point, the output is inverted (t2). When the counter value then reaches 15, which is the value of the second change point, the output is inverted again. As described above, the output is inverted at each change point, thereby generating a waveform represented by XV1 in FIG. 4.

Likewise, the waveform generators 205-2 to 205-4 store commands shown in FIG. 5 in the registers 211, respectively, at timings when the signals φD2 to φD4 change to "H". At a timing when the H counter value becomes 0 next, the waveform generators 205-2 to 205-4 transfer the commands to the registers 213 and start outputting the initial values. The waveform generators 205-2 to 205-4 invert the outputs at each change point, thereby generating waveforms represented by XV2 to XV4 in FIG. 4. Each output is assumed to be binary. For this reason, if the level of the output is inverted an even number of times, the output returns to the same original value.

Assume that the waveform generators 205-5 and 205-6 for generating the horizontal transfer pulses H1 and H2 generate them in the above-mentioned manner. In this case, since their outputs need to be inverted for every increment in counter value, the number of change points becomes large, and thus the capacity of the registers needs to be considerably large. Additionally, the register 211 may not be able to store the data of all change points in one DCLK period (i.e., a period of time when the counter value is 5 or 6). Hence, it is more efficient to make the waveform generators 205-5 and 205-6 each have an arrangement as shown in FIG. 6.

Figure 6:
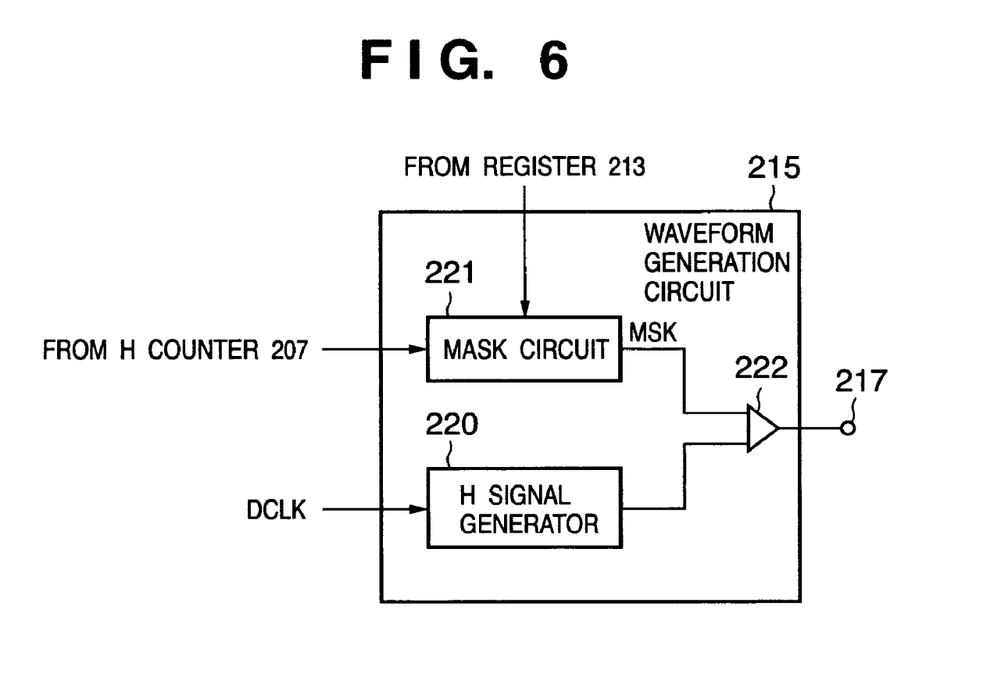
FIG. 6 is a block diagram showing an example of an arrangement of a waveform generator which generates a horizontal transfer pulse.

In FIG. 6, an H signal generator 220 constantly generates and outputs a signal having a portion from t9 of the waveform of the signal H1 or H2 shown in FIG. 4, in synchronism with the DCLK signal. A mask circuit 221 outputs a signal MSK having an initial value of "L" and the first change point of 23 on the basis of the initial value and the information of the first change point shown in FIG. 5, which are stored in the register 211 when the H counter value is 5 or 6 and then transferred to the register 213. An AND gate 222 performs an operation for the output MSK from the mask circuit 221 and a signal from the H signal generator 220 to generate a signal represented by H1 or H2 in FIG. 5. This can generate the horizontal transfer pulses H1 and H2 using a small number of commands.

The AND gate 222 is employed in the arrangement shown in FIG. 6. The present invention, however, is not limited to this arrangement. To mask the output of the H signal generator 220 as needed, various arrangements are available. For example, a switch which is turned on/off depending on the output of the mask circuit 221 may be provided between the H signal generator 220 and the output terminal 217.

It is, of course, possible to generate a waveform which does not change within a horizontal period (HD) by setting the number of change points to 0 or making the value of a change point larger than an increment in count in one HD period. In the above example, a case wherein the number of change points is two is described. However, the number may be three or more.

By controlling the initial value, the number of change points, and the counts per horizontal period (HD) for each wave generation circuit in the above-mentioned manner, a desired waveform can be generated from a desired waveform generation circuit every horizontal period.

Figure 10:
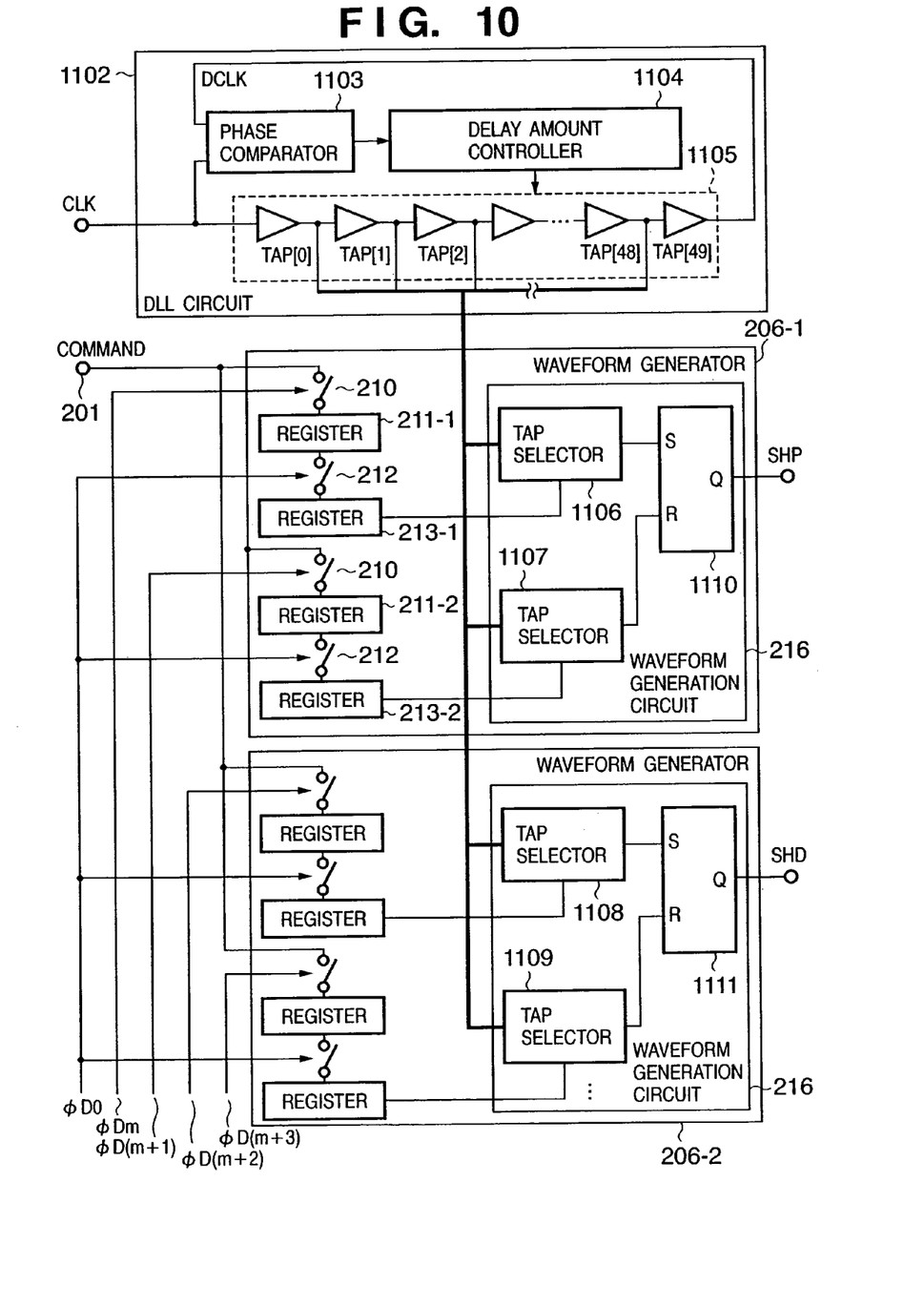
FIG. 10 is a block diagram showing a part of the timing generator arranged in addition to the configuration shown in FIG. 3 according to the embodiment of the present invention.

Next, a portion of the timing generator 111, which generates the correlated double sampling pulses SHP and SHD to be supplied to the analog front end 103 will be described with reference to FIG. 10. Note that an arrangement shown in FIG. 10 is arranged within the timing generator 111 together with the arrangement shown in FIG. 3. The same reference numerals as in FIG. 3 denote circuit components which operate in the same manner as in FIG. 3, and a part of the arrangement such as the H counter 207 will not be illustrated.

In FIG. 10, a delay locked loop (DLL) circuit 1102 includes a phase comparator 1103, a delay amount controller 1104, and delay elements 1105. Reference numerals 1106 to 1109 denote tap selectors; and 1110 and 1111, SR flip-flops. Two tap selectors and one SR flip-flop constitute each of waveform generation circuits 216-1 and 216-2. Each waveform generator 206 includes the waveform generation circuit 216 and four registers 211-1, 211-2, 213-1, and 213-2, unlike the arrangement of FIG. 3.

The specific operation of the arrangement of FIG. 10 will be described next. Assume that the frequency of a clock to be supplied to the DLL circuit 1102 is 36 MHz, and the delay elements 1105 comprise 50 delay elements. The phase comparator 1103 detects a phase difference between the clock and the delayed clock DCLK, and the delay amount controller 1104 sets the respective delay amounts of the 50 delay elements 1105 to be uniform such that the clock and the delayed clock DCLK are made in-phase. More specifically, the DLL circuit 1102 generates 50 signals TAP[0] to TAP[49], whose phase shifts increase in steps of 1/50 of one cycle (=1/36 MHz). As described above, since the frequency is 36 MHz, the generated signals TAP[0] to TAP[49] have phase shifts which increase in steps of 555 psec (=1/(36× 50)). The signals TAP[0] to TAP[49] are separately input to the respective waveform generation circuits 216 by 50 signal lines. However, the signal lines in FIG. 10 are represented by a thick line for the sake of simplicity.

To generate the correlated double sampling pulse SHP, when the value of the H counter 207 shown in FIG. 3 is m (φDm=H), the waveform generator 206-1 stores in the register 211-1 a command indicating a delay element to be selected from the delay elements 1105. Similarly, when the counter value reaches (m+1) (φD(m+1)=H), the waveform generator 206-1 stores in the register 211-2 a command indicating a delay element to be selected. At a timing when the H counter value becomes 0 next, these commands are transferred to the registers 213-1 and 213-2, respectively. On the basis of the transferred commands, the tap selector 1106 selects one corresponding to the leading edge position of the signal SHP to be supplied to the analog front end 103 out of the 50 signals TAP[0] to TAP[49] which are output from the delay elements 1105, and the tap selector 1107 selects one corresponding to the trailing edge position. The selected signals are supplied to the SR flip-flop 1110, thereby generating the SHP signal.

In this manner, high-precision pulses can be generated using the signals TAP[0] to TAP[49].

Note that ADCLK can be generated in the same manner.

In the above example, the number of delay elements is 50. The present invention is, of course, not limited to this.

Figure 7:
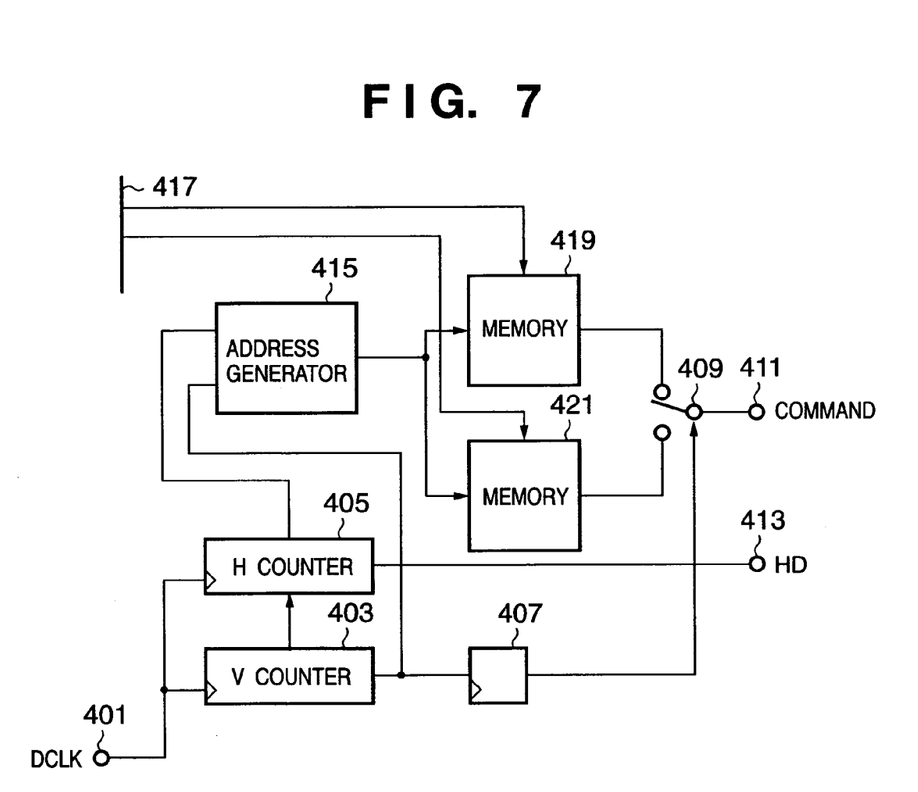
FIG. 7 is a block diagram showing the arrangement of portions involved in waveform generation, which are incorporated in a DSP according to the embodiment of the present invention.

FIG. 7 is a block diagram showing the arrangement of portions involved in waveform generation, which are incorporated in the DSP 109.

Reference numeral 401 denotes an input terminal to which the clock DCLK is input; 403, a vertical (V) counter; 405, a horizontal (H) counter; 407, a register; 409, a switch; 411, a command output terminal; 413, an HD output terminal; 415, an address generator; 417, a microcomputer bus; and 419 and 421, memories. When the user inputs data indicating a desired driving signal through an operation unit (not shown) such as a keyboard, various switches, or the like, the data is stored in the memory 419 or 421 through the microcomputer bus 417.

The vertical counter 403 and horizontal counter 405 are designed to generate timing pulses for reading a two-dimensional image from the area image sensor 101. The counts of both the counters are supplied to the address generator 415. The address generator 415 generates using vertical and horizontal counts respective addresses to be supplied to the memories 419 and 421 and supplies the addresses to the memories 419 and 421. The output from the vertical counter 403 is supplied to the register 407. The value of the register 407 is inverted every frame, and the result is supplied to the switch 409. With this operation, the memories 419 and 421 are alternately selected every frame, and commands from the memories are alternately output to the terminal 411 by frame. The horizontal counter 405 generates the HD signal and output it to the output terminal 413.

Figure 8:
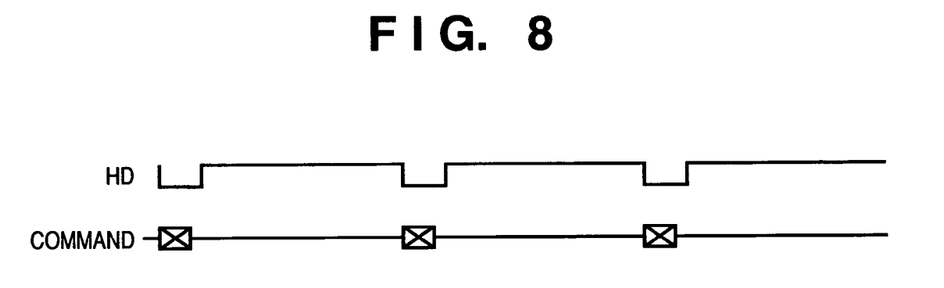
FIG. 8 is a timing chart of signals output from a terminal 411 and 413.

FIG. 8 shows signals output from the output terminal 411 or 413. As shown in FIG. 8, a command is output at the trailing edge of an H blanking signal. When a required number (e.g., the number of required signals and the number of waveform generators) of commands are output, the command output is stopped. Stopping outputting commands within an H blanking period can minimize the possibility that command data may get mixed with the output of the area image sensor 101 to cause noise.

In the arrangement shown in FIG. 7, the data of a waveform to be generated in the next frame is written in advance in one of the memories 419 and 421, which is not currently selected by the switch 409. In the next frame, the memory in which the data of the waveform is written is selected by the switch 409. As for all the waveforms to be generated every horizontal period, the initial values and the waveform data about the change points whose number is predetermined for each waveform are read out and supplied to the waveform generators 205 through the output terminal 411 and input terminal 201 of FIG. 3. The H counters 207 and 405 synchronize with each other using the horizontal blanking signal HD.

As described above, large-scale memories like the memories 419 and 421 are arranged on the side of the DSP 109, which is driven at a low voltage along with the progress of the process, and the horizontal counter, decoder, waveform generators, and DLL circuit are arranged on the side of the timing generator 111, which generates pulses for driving the area image sensor 101.

The DSP 109 is formed by micropatterning process and driven at a low voltage. On the other hand, since the DLL circuit comprises an analog circuit and is required to generate high-precision pulses, it cannot be formed by micropatterning process. For this reason, if the DLL circuit and the memory 419 are arranged on the same semiconductor substrate, the memory 419 cannot be formed by micropatterning process. Hence, the circuit scale increases, thereby considerably increasing the power consumption.

The above-mentioned problem is solved by arranging the DLL circuit and the memories 419 and 421 on separate semiconductor chips.

The circuit scales of the horizontal counter, decoder, and wave generators are not so large as those of the memories 419 and 421. For this reason, the horizontal counter, decoder, and wave generators are arranged on the same semiconductor substrate as that of the DLL circuit.

As described above, the timing signal generator can flexibly cope with a case wherein an area image sensor different from the one described above is employed. Accordingly, a reduction in development cost of DSPs and timing generators can be realized.

As has been described above, the data for the next frame is written in the memory 419 or 421, and the data of the waveform for the next horizontal period is written in advance from the DSP 109 to the timing generator 111 every horizontal period. With this arrangement, a general-purpose timing generator which is independent of the type of an area image sensor can be realized. To drive the timing generator in a plurality of modes such as a moving image sensing mode, still image sensing mode, monitor mode, and the like, data to be written in the memories 419 and 421 are changed. Only with this change, driving in various modes can be easily realized.

The above embodiment has described a case wherein a timing generator according to the present invention is used to drive an area image sensor. However, the present invention is not designed specifically for image sensing apparatuses. The present invention, of course, can be applied to various apparatuses which require timing control.

The present invention is not limited to the above embodiments and various changes and modifications can be made within the spirit and scope of the present invention. Therefore to apprise the public of the scope of the present invention, the following claims are made.

What is claimed is:

1. A timing signal generation apparatus including a plurality of waveform generation units, each waveform generation unit comprises:
   a first storage device that stores externally input data of a signal waveform to be generated; and
   a signal generation unit that generates and outputs a signal on the basis of the data stored in said first storage device,
   wherein the data stored in said first storage device is updated at a predetermined timing,
   wherein each of said waveform generation units further comprises a second storage device, and
   said apparatus comprises a control unit that controls each of said waveform generation units so as to transfer data of a signal waveform stored in said first storage device to said second storage device before storing the data of the signal waveform in said first storage device and supplies the data from said second storage device to said signal generation unit.

2. A timing signal generation apparatus including a plurality of waveform generation units, each waveform generation unit comprises:
   a first storage device that stores externally input data of a signal waveform to be generated; and
   a signal generation unit that generates and outputs a signal on the basis of the data stored in said first storage device,
   wherein the data stored in said first storage device is updated at a predetermined timing,
   further comprising a plurality of series-connected delay elements that delay an externally input clock signal, and the clock signal delayed by each delay element is output to said succeeding delay element and outside,
   wherein said signal generation unit selects one of delayed clock signals output from the delayed elements on the basis of the data stored in said first storage device and generates a signal using the selected delayed clock signal.

* * * * *